United States Patent [19]

Riemer

[11] Patent Number: 5,247,172

[45] Date of Patent: Sep. 21, 1993

[54] POSITION SENSING SYSTEM WITH MAGNETIC COUPLING

[75] Inventor: Dietrich E. Riemer, Auburn, Wash.

[73] Assignee: The Boeing Company, Seattle, Wash.

[21] Appl. No.: 933,344

[22] Filed: Aug. 21, 1992

[51] Int. Cl.$^5$ .............................................. H01J 5/16
[52] U.S. Cl. ................................ 250/227.21; 250/561; 324/220
[58] Field of Search ............. 250/561, 227.21, 227.25, 250/237 R, 237 G, 227.11; 356/373, 375; 324/220

[56] References Cited

U.S. PATENT DOCUMENTS

| | | | |
|---|---|---|---|
| 2,687,646 | 8/1954 | Goddard | 73/228 |
| 4,692,614 | 9/1987 | Wilson et al. | 250/231 |
| 4,694,619 | 9/1987 | Sackett | 250/231 |
| 4,746,791 | 5/1988 | Forkel | 250/231 |
| 4,796,966 | 1/1989 | Kovaleski et al. | 350/96.2 |
| 4,837,777 | 6/1989 | Jones et al. | 250/227.21 |
| 5,120,951 | 6/1992 | Small | 250/227.21 |

Primary Examiner—David C. Nelms
Assistant Examiner—K. Shami
Attorney, Agent, or Firm—Joan H. Pauly

[57] ABSTRACT

The position of an aircraft control surface actuator is determined by a combination of a linear transducer and light radar. A link has a first end attached to a magnet and a second end attached to the actuator. Movement of the actuator causes the magnet to move axially along the outer cylindrical surface of a hermetically sealed housing. The transducer includes a magnetic coupling between the magnet end and a ferromagnetic follower inside the sealed housing. Preferably, the magnet is a ring magnet, and the ferromagnetic follower is a tubular cylinder. The follower carries a corner cube reflector that receives light from, and reflects light back to, the end of an optical fiber. The transit time of the light is measured and is used to calculate the distance between the fiber end and the reflector to thereby determine the position of the actuator. The hollow configuration of the follower increases magnetic flux exiting from the flat end surfaces of the follower to increase the strength of the magnetic coupling and also reduces the mass of the follower to reduce the displacement inaccuracy during acceleration. The length of the follower is preferably equal to the distance between the poles of the magnet.

25 Claims, 8 Drawing Sheets

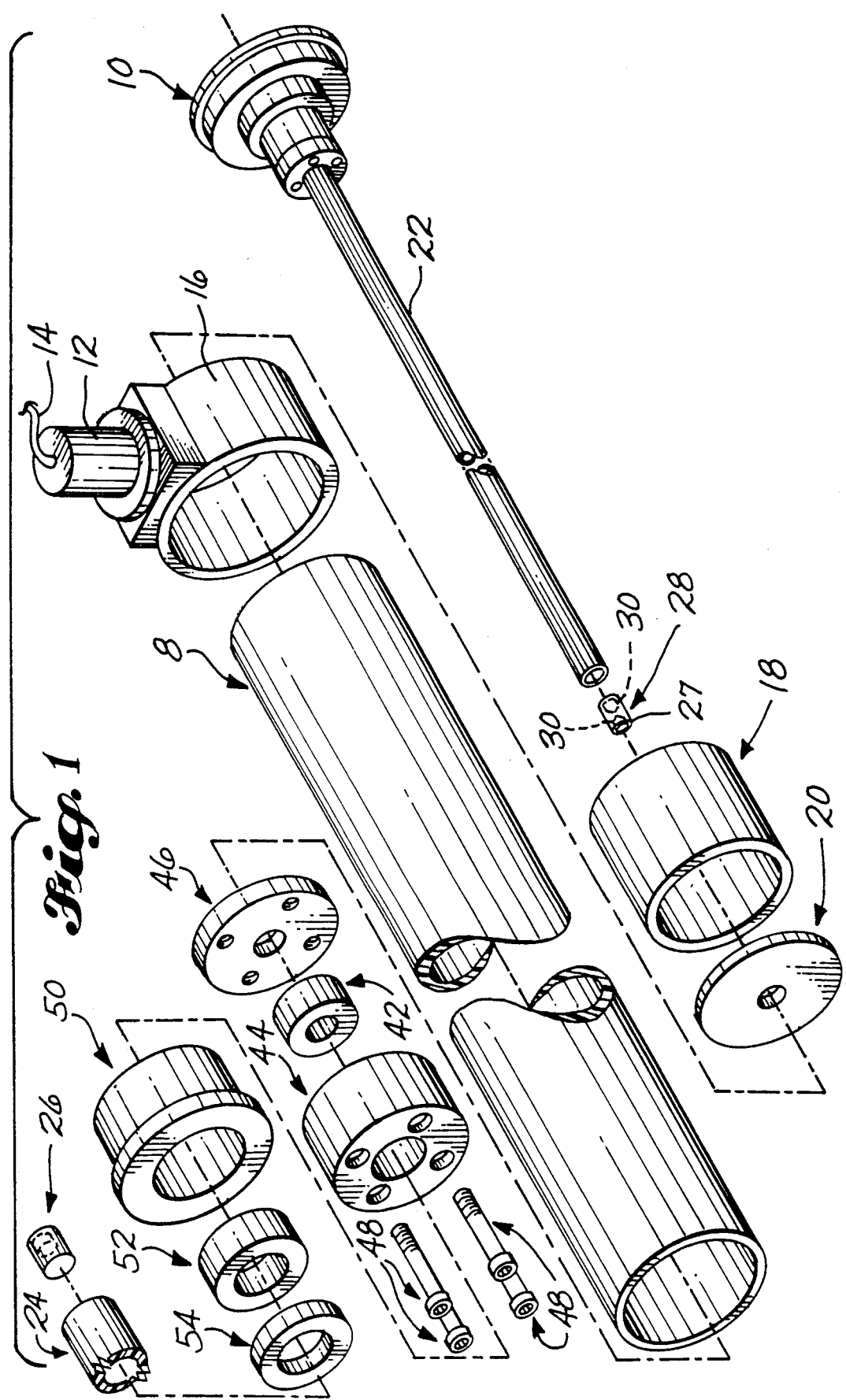

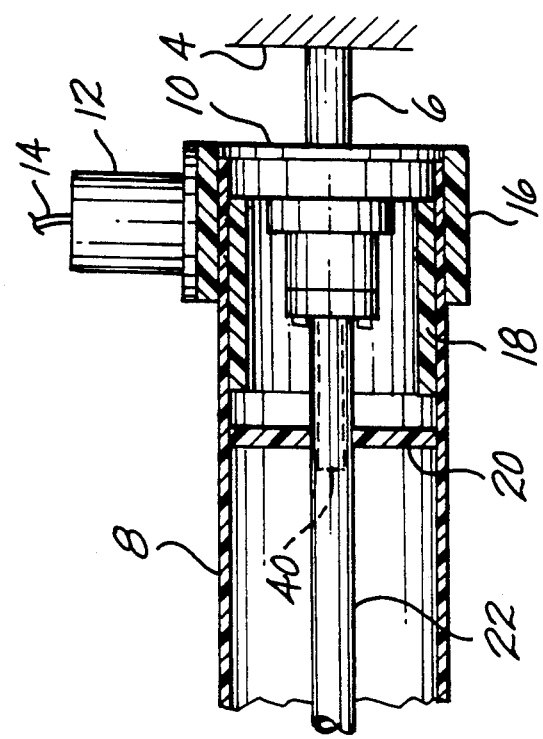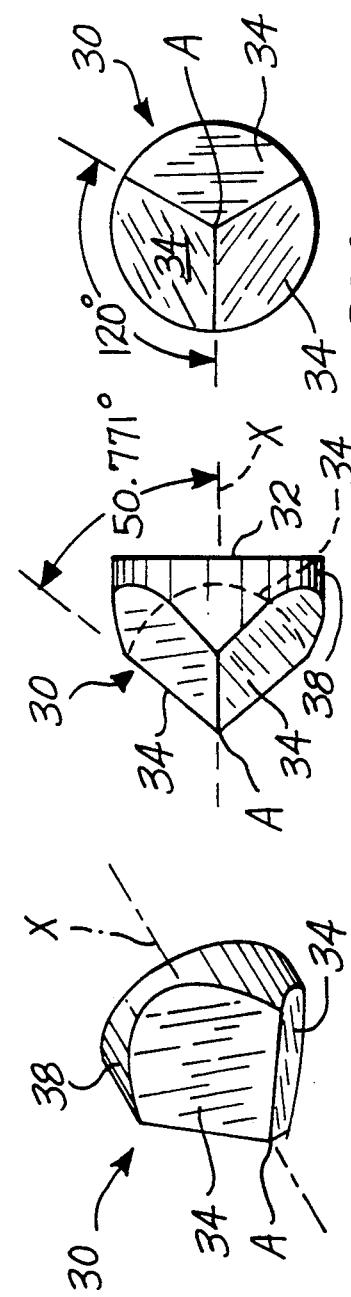

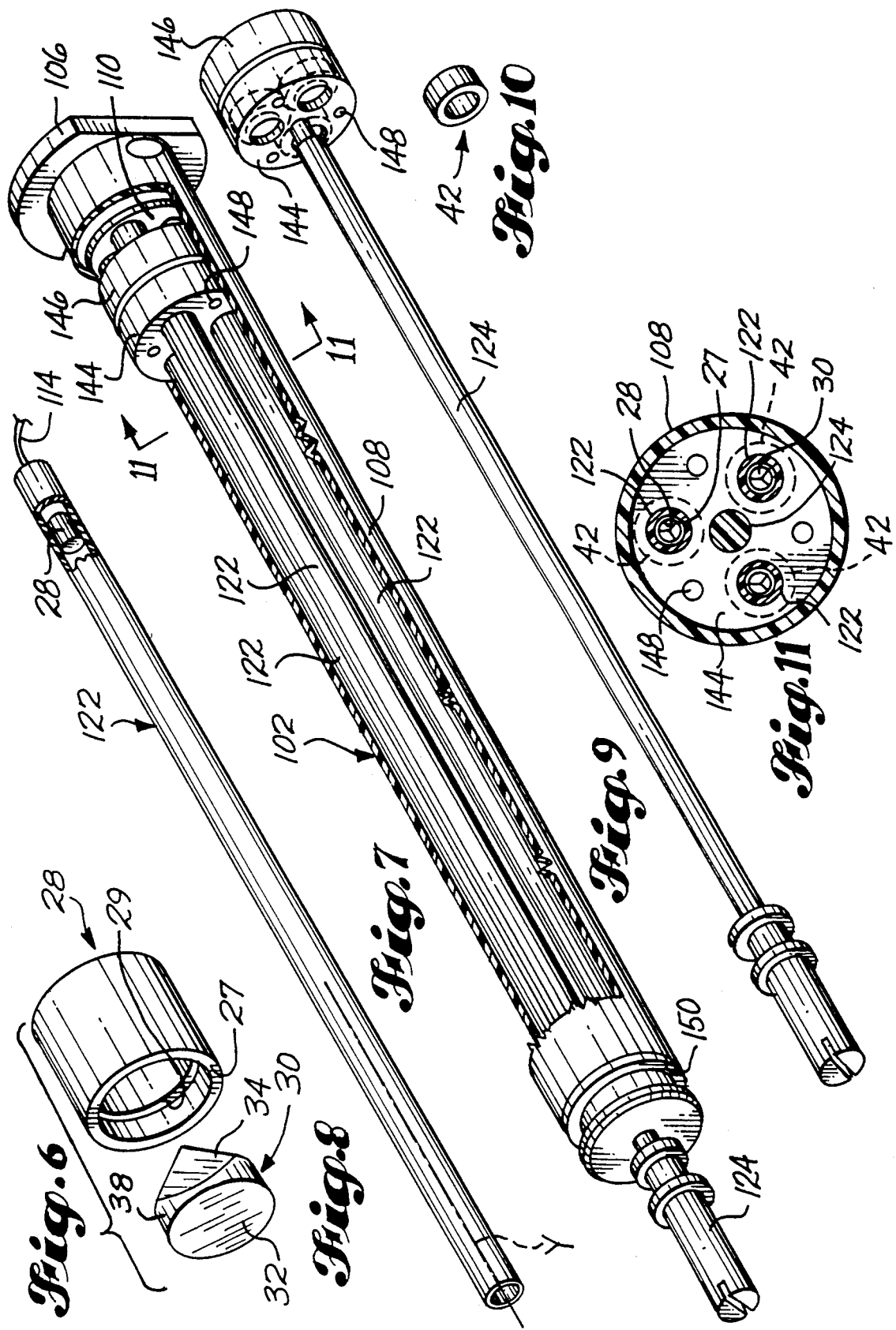

POSITION SENSING SYSTEM WITH MAGNETIC COUPLING

TECHNICAL FIELD

This invention relates to methods and apparatus for sensing the position of a structure and, more particularly, to a system in which a link has opposite ends attached to the structure and a magnet that is axially movable along the outer surface of a non-magnetic tubular housing defining a hermetically sealed inner space, and a ferromagnetic follower positioned in the space is magnetically coupled to the magnet to follow axial movement of the magnet and carries a reflector that receives light from and reflects light back to a fiber optic transmitter and receiver extending into the space.

BACKGROUND INFORMATION

Modern aircraft include a number of control surfaces and actuators therefor. In order to maintain control over an aircraft during flight, it is important to have accurate information regarding the position of the control surfaces. Determination of a control surface position is typically accomplished by determining the position of the actuator for the surface. The aircraft environment presents a number of serious problems in relation to position sensing systems. Since changes in the control surface positions can have high rates of acceleration, the sensing system must be capable of withstanding high accelerations and maintaining accuracy when subjected to such accelerations. The system must also be able to operate under severe pressure and temperature conditions and in the presence of contaminants. The area around the control surfaces and the actuators typically has a high level of film and particle contaminants. The problem is especially severe when the actuator is immersed in hydraulic fluid. All of these operating and environmental conditions make it very difficult to design a sensing system that will remain reliable and accurate over a reasonable usable life. In addition, an aircraft sensing system is subject to the ever present need to minimize the weight of the system and the space it requires. Another factor that is especially of concern in relation to military aircraft is that the sensing system remain operable in the presence of electromagnetic interference (EMI) and electromagnetic pulses (EMP).

SUMMARY OF THE INVENTION

Radar is used to measure distances of objects from an observation point. The basic principle on which radar operates is sending out an electromagnetic wave from the observation point and evaluating the wave reflection from the object. The distance range that a radar system can cover with reasonable accuracy is a function of the wavelength of the electromagnetic signal. Light is a high frequency electromagnetic wave. It has a range of wavelengths with an order of magnitude of about one micron. This range of wavelengths is suitable for the measurement of short distances in a range below one meter. Light radar can be used for the measurement of distances in equipment, such as the distance of a moving actuator from a fixed point. The choice of light radar for use in an aircraft environment has a significant advantage over electro-mechanical instrumentation since the optical signals in the light radar are immune to EMI and EMP, which could destroy the effectiveness of electro-mechanical instrumentation.

A subject of the invention is a sensor for determining the position of a structure. According to an aspect of the invention, the sensor comprises a non-magnetic tubular housing with a longitudinal axis. The housing defines a hermetically sealed inner space and includes an axially extending sidewall. A magnet is positioned adjacent to and is axially movable along an outer surface of the housing sidewall. The magnet has opposite poles axially spaced apart. A link has a first end attached to the magnet and a second end attachable to the structure. A ferromagnetic follower is positioned in and axially movable within the hermetically sealed space. The follower is magnetically coupled to the magnet to follow axial movement of the magnet. A fiber optic transmitter and receiver extends into the space. A reflector carried by the follower is positioned to receive light from, and reflect the light back to, the transmitter and receiver. The follower has a rest position radially adjacent to the magnet. The magnet is capable of restoring the follower to its rest position upon relative axial movement between the magnet and the follower. Preferably, the follower has a length substantially equal to the axial distance between the two poles of the magnet.

In their preferred configurations, the magnet is a ring magnet and surrounds the housing, and the follower is substantially cylindrical and has opposite flat end surfaces normally adjacent to the poles of the magnet. The follower preferably has a cavity formed therein to increase magnetic flux exiting from its end surfaces. In the preferred embodiment, the cavity opens onto a first one of the end surfaces with the reflector being received into an outer end portion of the cavity adjacent to such first end surface. These preferred features of the magnet, follower, and reflector help to optimize the design of the sensor and maximize the accuracy thereof.

The transmitter and receiver preferably comprises a single optical fiber that both transmits and receives light. This form of the transmitter and receiver is preferably provided in combination with a reflector that comprises a corner cube reflector. In the preferred embodiment of the sensor, this combination of features helps to simplify the structure of the optical components of the system while maximizing the degree of accuracy. Light transmitted along a path to the corner cube reflector is reflected back along the same path. This makes the calculation of the distance traveled by the light very simple.

An optional feature of the sensor is the provision of a second reflector. The second reflector is carried by the follower and faces about 180° away from the transmitter and receiver. A second transmitter and receiver extends into the sealed space. The second reflector is positioned to receive light from, and reflect light back to, the second transmitter and receiver. This arrangement gives the sensor a self-checking capability.

Another way of increasing the accuracy and reliability of the sensor is to provide built-in redundancy. According to an aspect of the invention, the sensor comprises a non-magnetic basket. A link has a first end attached to the basket and a second end attachable to the structure. The sensor also includes a plurality of sensor units. Each unit comprises a non-magnetic housing, a magnet carried by the basket, a ferromagnetic follower, a fiber optic transmitter and receiver, and a reflector. These sensor unit elements preferably have the characteristics described above.

Another subject of the invention is a linear transducer comprising a non-magnetic tubular housing, a ring magnet, and a cylindrical ferromagnetic follower. The housing has a longitudinal axis and defines an inner space. The magnet surrounds, and is axially movable along, an axially extending cylindrical sidewall of the housing. The opposite poles of the magnet are axially spaced apart. The follower is positioned in and axially movable within the space defined by the housing. The follower is magnetically coupled to the magnet to follow axial movement of the magnet. The follower has opposite flat end surfaces normally adjacent to the poles of the magnet. A cavity is formed in the follower to increase magnetic flux exiting from the end surfaces. The follower has a rest position radially adjacent to the magnet. The magnet is capable of restoring the follower to the rest position upon relative axial movement between the magnet and the follower. The combination of features of the linear transducer of the invention permits the maximization of the effectiveness of the magnetic coupling between the magnet and the follower to minimize deviations in the axial position of the follower relative to the magnet.

Still another subject of the invention is a method for determining the position of a structure. According to an aspect of the invention, the method comprises providing a non-magnetic tubular housing having a longitudinal axis and defining a hermetically sealed inner space. A magnet is positioned adjacent to an outer axially extending surface of the housing with the opposite poles of the magnet axially spaced apart. A ferromagnetic follower in the sealed space and a reflector carried by the follower are also provided. A transmitting and receiving end of a fiber optic transmitter and receiver is positioned in the space directed toward the reflector. The magnet is linked to the structure to cause movement of the structure to translate the magnet axially along the housing surface. The magnet is magnetically coupled to the follower so that axial movement of the magnet causes corresponding axial movement of the follower. The follower is aligned to be radially adjacent to the magnet. Light is transmitted through the transmitting and receiving end into the space and to the reflector, which reflects the light back to the transmitting and receiving end. The transit time of the light from the transmitting and receiving end to the reflector and back to the transmitting and receiving end is measured. The distance between the transmitting and receiving end and the reflector is calculated as a function of the transit time.

An optional feature of the method of the invention is checking the calculated distances for accuracy. A second reflector carried by the follower is provided and faces about 180° away from the transmitting and receiving end. A second fiber optic transmitting and receiving end is directed toward the second reflector. Light is transmitted through the second end into the space and is reflected back by the second reflector. The travel time of the light received and reflected by the second reflector is measured, and the distance between the second end and the second reflector is calculated as a function of the travel time. The distance between the transmitting and receiving ends and the distance between the reflectors is used to check the calculated distances for accuracy.

The system of the invention provides accurate and reliable determination of the position of aircraft structures, such as control surface actuators. By the use of fiber optics and light radar, the system of the invention avoids the vulnerability to EMI and EMP that is characteristic of electro-mechanical instrumentation. The simplicity of the structure of the sensor of the invention allows the weight and size of the sensing system to be minimized so that the system can easily be incorporated into virtually any existing aircraft environment and can be included in new aircraft designs without creating any significant design restraints on other aircraft components. Since the sensing of distances in the system is accomplished by use of light, the sensor is unaffected by environmental conditions such as temperature and pressure. The system of the invention also allows the sensor to be designed to withstand and continue to function under the high acceleration rates that can be experienced in the aircraft environment. Overall, the system of the invention is highly reliable and cost effective.

A major accomplishment of the invention is the protection of the system apparatus from contaminants and the maintenance of system reliability in highly contaminated environments. The reliable operation of the system in the presence of contaminants is accomplished without sacrificing the accuracy of the determinations of actuator positions.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is an exploded pictorial view of a first preferred embodiment of the sensor of the invention.

FIG. 2 is a sectional view of the apparatus shown in FIG. 1 in an assembled condition and attached to a fixed support, with parts shown in elevation.

FIG. 3 is a pictorial view of the preferred embodiment of the reflector shown in FIGS. 1 and 2.

FIG. 4 is an elevational view of the reflector shown in FIG. 3.

FIG. 5 is a plan view of the reflector shown in FIGS. 3 and 4.

FIG. 6 is an exploded pictorial view of the reflector shown in FIGS. 3-5 and the follower into which it is received.

FIG. 7 is a pictorial view of a second preferred embodiment of the sensor, with foreground portions cut away.

FIG. 8 is a pictorial view of the tubular housing of one of the sensing units shown in FIG. 7, with foreground portions cut away.

FIG. 9 is a pictorial view of the mechanical coupling shown in FIG. 7.

FIG. 10 is a pictorial view of one of the magnets of the preferred embodiment shown in FIG. 7.

FIG. 11 is a sectional view taken along line 11—11 in FIG. 7.

BEST MODES FOR CARRYING OUT THE INVENTION

Figure 13:
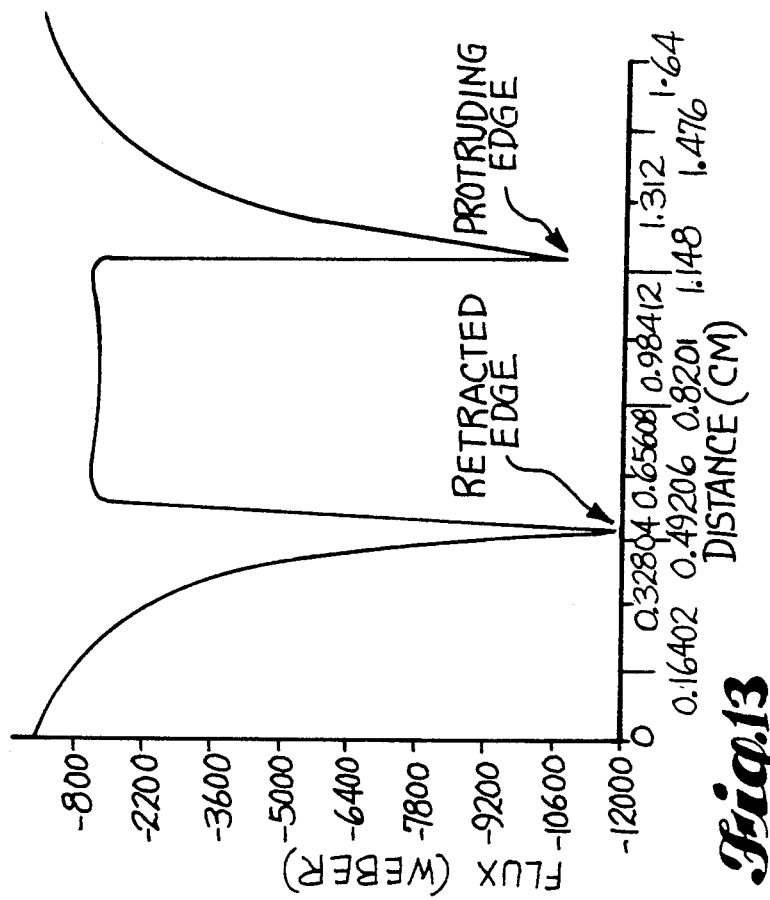
FIG. 13 is a graph showing magnetic flux as a function of the distance along an axial line that runs along the cylindrical surface of the follower and beyond.

The drawings show two embodiments of a sensor 2, 102 that are constructed in accordance with the invention and that also constitute the best modes for carrying out the apparatus of the invention currently known to the applicant. The drawings also illustrate the best modes for carrying out the method of the invention currently known to the applicant. The invention encompasses a system for determining the position of a structure, and a linear transducer that is used in the system. It is anticipated that this will be the primary use for the transducer of the invention. However, it is intended to be understood that the transducer could also be used to advantage in a variety of other applications.

The applicant conceived the invention as part of a development program at the facilities of the assignee of the applicant. During the program, the goal of using light radar in a position sensor was adopted because of the many advantages of light radar, including its immunity to EMI and EMP. The applicant and others working on the program realized that, in a sensor employing light radar, the medium through which light is transmitted must be very clear so that the light can complete a round trip from the transmitter to a reflector and back without dispersion or unwanted reflections of the light. In addition, the reflector must be kept very clean to assure a strong reflected light signal. In order to maintain the medium and the reflector free from contaminants, the reflector and medium need to be isolated from the surrounding contaminate laden environment.

In the development program, it was initially assumed that the necessary isolation could be achieved by positioning a reflector inside a sealed enclosure, attaching the reflector to a shaft that extends out of the enclosure and moves as the object whose position is to be determined moves, and providing a tight seal around the shaft where it exits the enclosure. The seal around the shaft in this arrangement is a dynamic seal since it extends around a moving part. A disadvantage of this type of seal is that it tends to be vulnerable to leaking and, thus, could permit leakage of contaminants, such as hydraulic fluid, into the sealed enclosure during the operating life of the sensor. This would degrade the accuracy of the sensor and could even destroy its operability. In order to avoid the reliability risks of the dynamic seal, the applicant decided to replace the direct mechanical linkage between the reflector and the actuator whose position is being measured by a magnetic coupling. Because a magnetic field can couple through walls, the space in which the reflector is located and the light is transmitted may be permanently sealed to virtually eliminate any possibility of leakage of contaminants into the space.

The system of the invention uses light radar for determining the position of a structure, such as a control surface actuator. The basic components of the light radar include a reflector and an optical fiber, which has a transmitting and receiving end. Both the reflector and the transmitting and receiving end of the fiber are positioned inside a hermetically sealed space. The space is the inner space defined by a non-magnetic tubular housing in which a ferromagnetic follower that carries the reflector is freely movable. A permanent magnet is positioned adjacent to an outer surface of the housing and is movable along the housing. The magnet is mechanically linked to the structure. Magnetic coupling between the magnet and the ferromagnetic follower translates axial movement of the magnet into axial movement of the follower and the reflector within the sealed space.

Before describing the details of the preferred embodiments of the method and apparatus of the invention, it is useful to consider the theoretical underpinnings of the magnetic coupling. Part of the conception of the invention involved the verification that a position sensor utilizing a magnetic coupling would meet the requirements of an aircraft environment and operate accurately and reliably in such an environment.

THEORY OF THE MAGNETIC HOLDING FORCE

For the purposes of discussion, a simple system in which a magnetic force is created can be viewed as requiring three components. These components are a magnet, a ferromagnetic part in the field of the magnet, and a gap between the magnet and the part. The mechanical force of the magnet on the part is caused by the tendency of the system to seek a minimum energy content.

The energy content of a magnetic field can be expressed by the following equation:

$$E = \tfrac{1}{2} \int H \, V \, dV,$$

where H = magnetic field strength, B = magnetic flux density, and V = air gap volume. If the field is assumed to be uniform, H and B are constants and can be moved outside the integral for a simple solution:

$$E = \tfrac{1}{2} H B V$$

The magnetic flux density B is a function of the magnetic field strength H:

$$B = \mu \mu_0 H,$$

where $\mu_0$ is a physical constant representing the permeability of space and is equal to $4\pi 10^{-7}$, and $\mu$ is the relative permeability of air and equals 1. The magnetic field strength H can be expressed as a function of flux density B by rearranging the equation for flux density:

$$H = B/\mu \mu_0.$$

Inserting this value of H into the energy equation yields an expression for the energy content of the magnetic field as a function of flux density B:

$$E = (\tfrac{1}{2}) B^2 V / \mu \mu_0.$$

In the simple theoretical system under discussion, the magnetic flux component that exits the surface of the ferromagnetic part adjacent to the air gap flows from the ferromagnetic material into the air. The system energy content would be reduced by substituting high permeability material, e.g. iron, which has a permeability of about 100,000, for the air (permeability of 1) in the gap. The last equation set forth above illustrates the manner in which the energy content decreases as the permeability of the gap increases. Because of this relationship, in our theoretical system, forces develop tending to close the air gap.

When the ferromagnetic material in the system is able to move, the energy content E of the gap can be released. This fact can be used as a basis for the calculation of the mechanical force exerted by the magnet on the ferromagnetic material. The energy of the magnetic field can be expressed as work, which equals force times distance. Where F is the mechanical force and s is the width of the gap, $E = Fs$. Therefore:

$$Fs = (\tfrac{1}{2})B^2 V/\mu\mu_0,$$

and,
since $\mu = 1$ in the case of an air gap, $$Fs = (\tfrac{1}{2})B^2 V/\mu_0.$$

Substituting area A of the magnet pole times depth s of the gap for volume V yields:

$$F = (\tfrac{1}{2})B^2 A/\mu_0.$$

Since $\mu_0$ is a constant, the equation for the holding force of the magnet is:

$$F = (\tfrac{1}{2})B^2 A/4\pi 10^{-7}.$$

From this equation, it can be seen that the mechanical force exerted by the magnet is a function of the second power of the magnetic flux density B.

PRINCIPLE OF THE LINEAR MAGNETIC COUPLING

Figure 12:
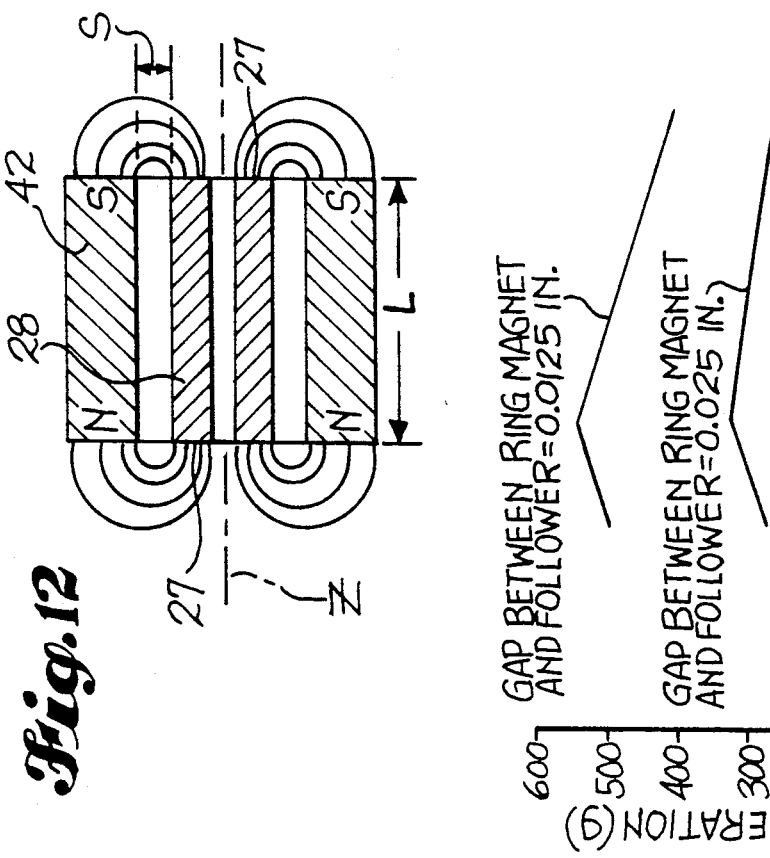
FIG. 12 is a schematic sectional view of the magnet and follower of the preferred embodiments illustrating the associated magnetic fields.

The preferred embodiments of the invention are based on a ring magnet and a cylindrical ferromagnetic follower with a length equal to the axial spacing of the magnet poles. This arrangement represents a special case of the magnetic holding forces discussed above. FIG. 12 illustrates the preferred configuration and the associated magnetic fields. In FIG. 12, Z represents the axis of the cylindrical follower 28. When the follower 28 is centered inside the ring magnet 42, both of its ends are being pulled by magnetic forces of equal strength because equal magnetic fluxes exit from the two flat end surfaces 27. When the follower 28 is in an axially off-center position, magnetic fluxes of different magnitudes exit from the two surfaces 27. The cylinder end recessed inside the magnet 42 develops a stronger flux at its surface 27 than the end sticking out from the magnet 42. In this condition, the mechanical forces are not balanced. Therefore, the force of the magnet 42 pulls the follower 28 back into the centered position shown in FIG. 12. In this position, the follower 28 is always in tension because it is being pulled by the force of the magnet 42 from both ends. Since the forces on both ends are equal, the illustrated position is an equilibrium position.

In the type of system shown in FIG. 12, the strength of the centering forces can be optimized by creating a large flux density B at the flat end surfaces 27 of the cylindrical follower 28. Two main factors are required for a strong flux. The first is a high magneto-motive force. The magneto-motive force is equal to the magnetic field strength H times the length L of the magnet 42. The magnetic field strength H is determined by the coercive force $H_C$ of the permanent magnet. The other main factor is a high flux saturation level in the follower 28. This factor is determined by the characteristics of the material of the follower 28. In order to provide the desired strong centering forces, the design must create a strong flux component normal to the flat ends 27 of the follower 28. Magnetic field lines that take a short cut from the magnet 42 to the follower 28 and enter the follower 28 through its rounded cylindrical sidewall are considered flux leakage and do not contribute to the centering action.

In the system of the invention, material is preferably removed from the center of the cylindrical follower 28 to give it a resulting tubular configuration, as shown in FIG. 12. The removal of the material reduces the mass of the follower 28 to reduce the displacement inaccuracy during acceleration. It also increases the flux exiting from the flat end surfaces 27. (It should be noted that, in this case, the flat cylinder ends 27 are annular in configuration.) Increasing flux exiting from the follower ends in this manner is subject to the limitations that the follower material not be saturated and that there not be excessive flux leakage around the cylindrical sidewall. The increase of the flux exiting from the flat end surfaces 27 is beneficial to the centering action because the mechanical force of the centering action is a function of the square of the magnetic flux density B.

When all other conditions are constant, the flux decreases as the length of the field lines between the magnet 42 and the cylinder ends 27 increases. The main factor affecting the length of the field lines is the width s of the gap between the magnet 42 and the follower 28. In the actual apparatus of the invention, the gap is occupied by the cylindrical sidewall of a non-magnetic tubular housing. The wall thickness of this sidewall is equal to the width of the gap. It is desirable to minimize the wall thickness in order to maximize the flux. The major limitation on the thinning of the wall thickness is the requirement that the tubular housing be able to withstand a maximum hydrostatic pressure p which, in a particular case, is determined by the relevant aircraft specifications. The wall thickness can be approximated in accordance with the equation:

$$s = (pD)/(2\sigma_0),$$

where $D$ = the inner diameter of the tubular housing, and $\sigma_0$ = the maximum permissible stress level.

For example, according to the above equation for wall thickness, a ceramic tube with an inner diameter of 0.15 inch requires a wall thickness of 0.002 inch to withstand the exterior burst pressure of 9000 psi that is specified for helicopters. This is based on a maximum compressive strength of 345,000 psi for an alumina ceramic. Tubes of such material, however, require a wall thickness of 0.010 inch to 0.020 inch in order to have sufficient mechanical strength for handling.

FINITE ELEMENT ANALYSIS OF THE LINEAR MAGNETIC COUPLING

Figure 14:
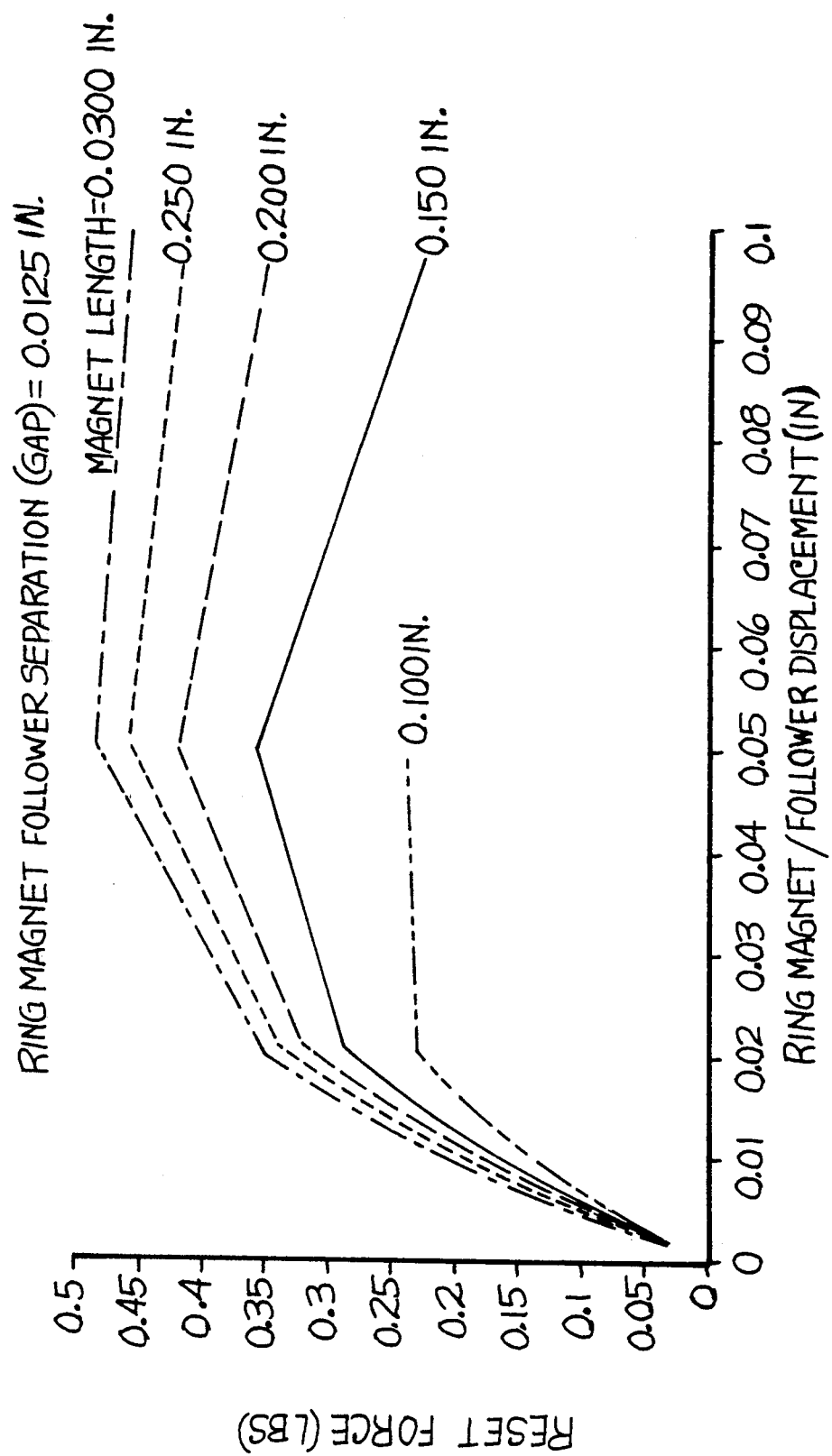
FIGS. 14 and 15 are graphs showing the reset force on the follower as a function of the relative displacement of the follower and the magnet.
Figure 15:
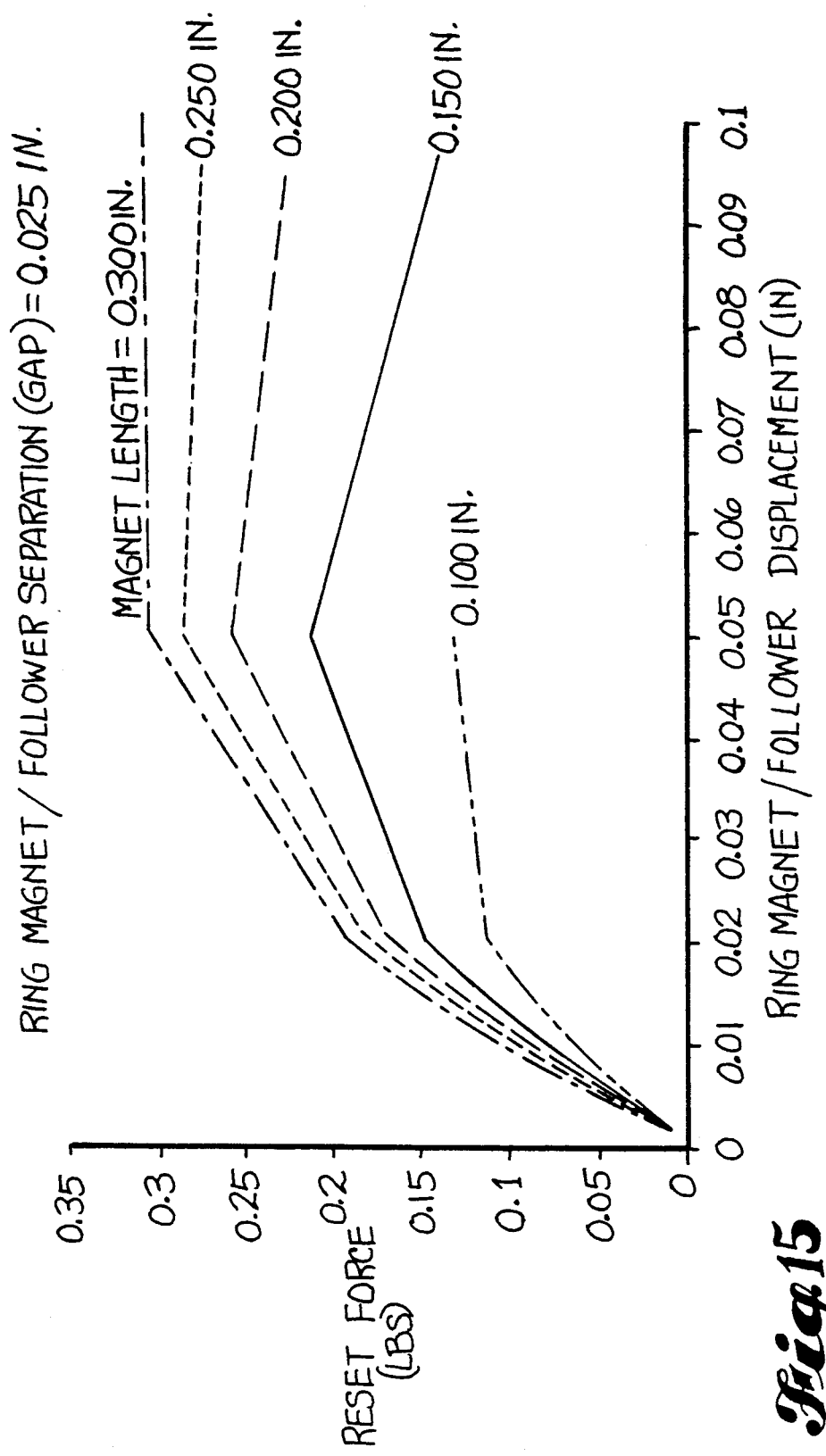

The operational characteristics of the arrangement shown in FIG. 12 were modeled using finite element analysis provided by a commercial software program ANSYS (Swanson Analysis Systems). The analysis assumes a ferromagnetic cylinder inside a ring magnet, with the cylinder and magnet being separated by an air gap. FIG. 13 illustrates how the magnetic flux varies along a line that extends axially along the cylindrical outer surface of the ferromagnetic cylinder and beyond each of the flat end surfaces when the cylinder is axially offset relative to the magnet. The flux magnitudes at the cylinder's flat end surfaces are indicated by the arrows and legends in FIG. 13. These magnitudes are unequal, and the flux difference results in a reset force exerted by the magnet on the cylinder. FIGS. 14 and 15 show the reset force plotted as a function of the relative displacement of the cylinder and the magnet for the case in which the cylinder is a tubular ferromagnetic follower. FIG. 14 shows the reset force when the gap width s is 0.0125 inch, and FIG. 15 shows the force for a gap width s of 0.025 inch.

Figure 16:
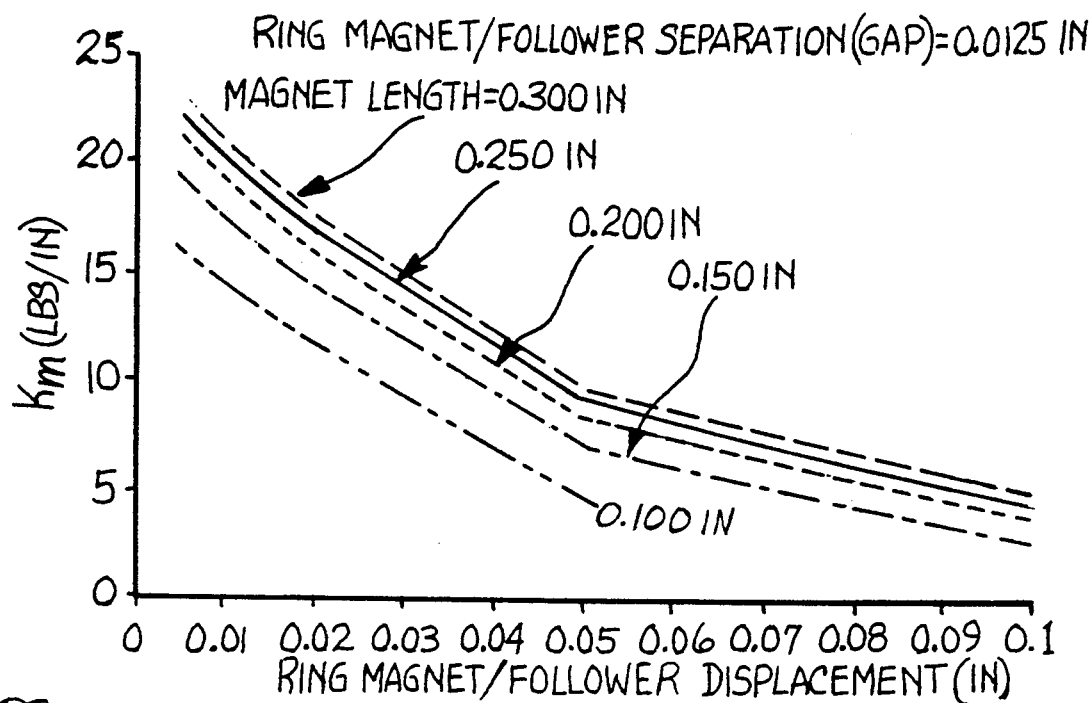
FIGS. 16 and 17 are graphs of the spring constant of the magnetic coupling as a function of the relative displacement of the follower and the magnet.
Figure 17:
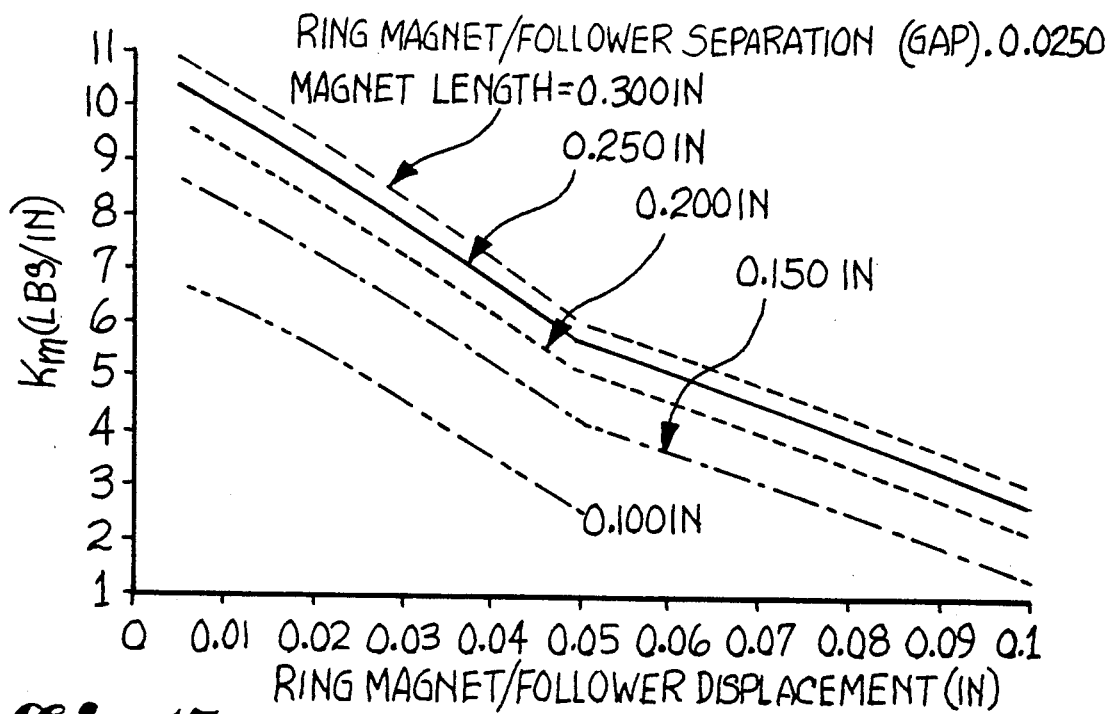

Dividing the reset force by the relative displacement yields the spring constant $k_m$ of the magnetic coupling. FIGS. 16 and 17 show the spring constant $k_m$ as a function of the relative magnet/follower displacement for the two gap widths shown in FIGS. 14 and 15. The spring constant $k_m$ for a zero displacement can be extrapolated from the graphs in FIGS. 16 and 17. In each of FIGS. 14–17, the ring magnet has an outer diameter of 0.300 inch and an inner diameter of 0.175 or 0.200 inch and is made from the material sold under the name Recoma 20. The follower has an outer diameter of 0.150 inch and an inner diameter of 0.075 inch and is made from the material sold under the name Vanadium Permenour.

The sensor of the invention is a linear transducer since it converts linear motion of the magnet into a magnetic flux differential on the follower, which differential creates a mechanical reset force on the follower that causes linear motion of the follower. The accuracy of the linear transducer is determined by the mass M of the follower, including the reflector that it carries, and the stiffness of the magnetic coupling, indicated by the spring constant $k_m = F/\Delta x$. When the magnet is accelerated, the follower pulls on the magnetic coupling with a force $F = Ma$, where a is the acceleration of the magnet. This results in the position inaccuracy:

$$\Delta x = (Ma)/k_m.$$

This equation can be rearranged to yield an inaccuracy per unit of acceleration:

$$\Delta x/a = M/k_m.$$

Figure 18:
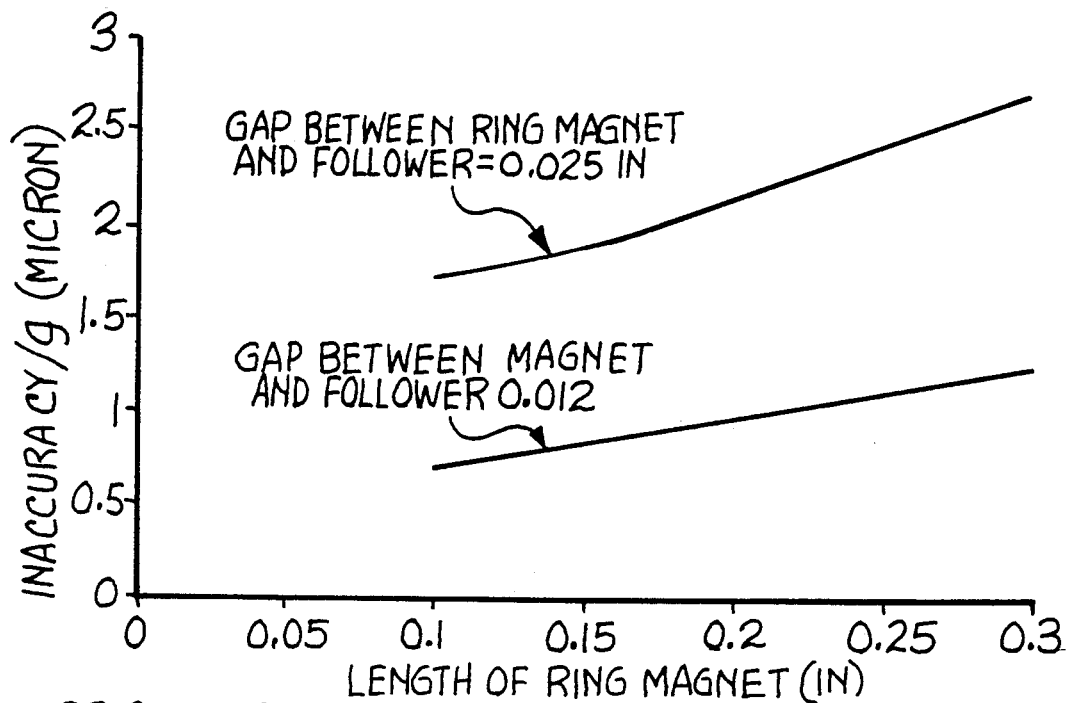
FIG. 18 is a graph of the centering inaccuracy of the follower inside the ring magnet per unit of acceleration as a function of the length of the magnet.

The acceleration of gravity g is commonly used as a unit for acceleration. FIG. 18 shows the inaccuracy per unit of acceleration g as a function of the length of the ring magnet for two different gap widths.

When a mass M is suspended by a spring, mechanical oscillations can occur. The resonance frequency f is determined by the equation:

$$f = (1/2\pi)\sqrt{k_m/M}.$$

Figure 19:
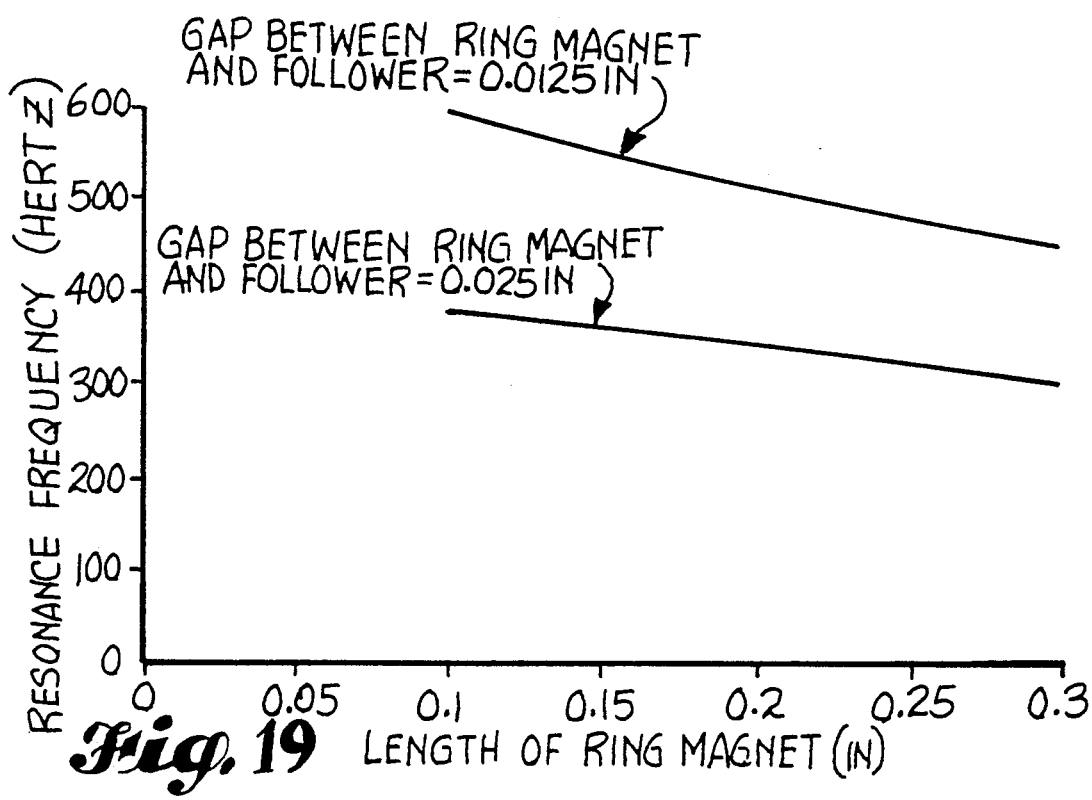
FIG. 19 is a graph of the resonance frequency of the follower as a function of the magnet length for two different values of the radial gap.

This equation was used to calculate the resonance frequency of a follower suspended inside a ring magnet, assuming no damping. FIG. 19 is a graph of the resonance frequency as a function of the magnet length for two different air gap widths.

The centering inaccuracies and the resonance frequencies encountered in actual practice will vary somewhat from the calculated values. A major factor causing the variation is the friction that occurs between the follower and the inner surface of the tubular housing in which it is positioned. The actual inaccuracy will be larger than the theoretical value because the friction creates drag on the follower. The vibration of the follower will be reduced by the drag. Other factors that can damp the vibrations include eddy currents in the tubular housing. Factors such as friction and eddy currents can be accounted for when determining the specifications of a particular sensor.

Figure 20:
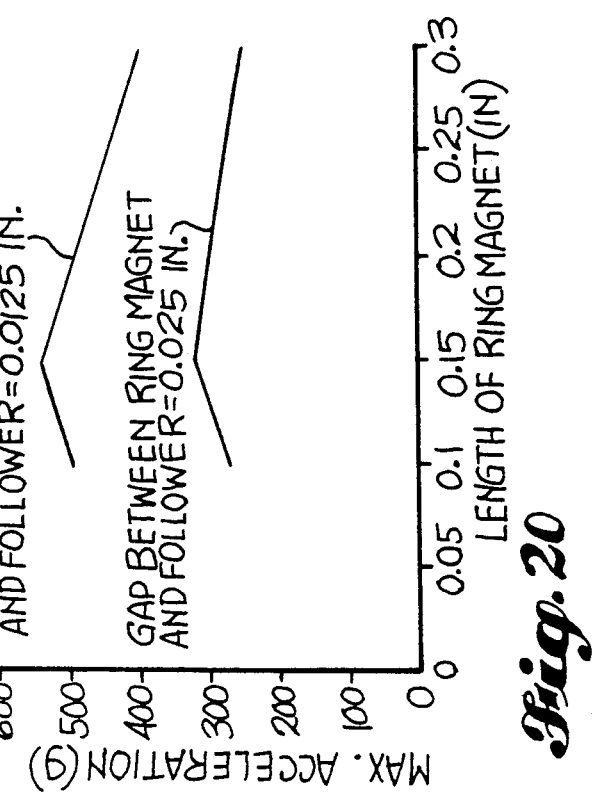
FIG. 20 is a graph of the maximum acceleration that can be tolerated by the magnetic coupling before the follower is totally separated from the ring magnet, as a function of magnet length.

Another important design consideration for the sensor is the maximum acceleration level that can be tolerated by the magnetic coupling before the follower is totally separated from the ring magnet. The maximum acceleration level can be calculated using the maximum reset force levels shown in FIGS. 14 and 15 and the mass of the follower plus the reflector. The results of the calculations are shown in FIG. 20. These results indicate that a position sensor with the type of magnetic coupling illustrated in FIG. 12 can tolerate very high acceleration levels and therefore can provide acceptable performance for various applications, including sensing the position of control surface actuators in aircraft.

PREFERRED EMBODIMENTS OF THE INVENTION

A first preferred embodiment of the sensor 2 is shown in FIGS. 1 and 2. The sensor 2 includes a cylindrical sleeve that forms a main housing 8. The opposite ends of the housing 8 are closed by end caps 10, 50. Referring to FIG. 21, the end cap 10 shown on the right therein is attached to a fixed support structure 4 by means of a support member 6 to thereby attach the sensor 2 to the support structure 4.

The linear transducer and light radar portions of the apparatus discussed above are mounted within the housing 8. The hermetically sealed environment for the reflector and the light transmitting medium of the light radar is provided by a hermetically sealed tubular housing 22 which is coaxial with the main housing 8. The reference character Y in FIG. 2 indicates the common axis of the main housing 8 and the hermetically sealed housing 22. A first end of the housing 22, shown on the right in FIG. 2, is supported by and attached to the end cap 10. The opposite end of the housing 22 carries an end bearing 26 that is slidably supported in a tubular input shaft 24 that extends into the housing 8 through the end cap 50. A bearing 52 and a seal 54 carried by the end cap 50 allow the shaft 24 to slide smoothly in an axial direction relative to the housing 8 and help to keep the interior of the housing 8 substantially free from contaminants. The opposite end of the housing 8 is sealed by a ring 18. Axially inwardly from the ring 18 there is a radial support ring 20 that provides additional support for the end of the tubular housing 22 attached to the end cap 10 and acts as a stop for the basket 44, 46 that carries the magnet 42, as described below.

The magnet 42 is a ring magnet with axially-spaced opposite poles (FIG. 12). The magnet is preferably a permanent magnet but could also be an electro-magnet. As shown in the drawings, the magnet 42 is a continuous ring. The ring could also be formed by separate, circumferentially spaced segments. The magnet 42 surrounds the tubular housing 22 and is axially movable along the outer cylindrical surface of the housing 22. Movement of the magnet 42 along the housing 22 is provided by movement of the input shaft 24. The magnet 42 is mounted on the end of the shaft 24 inside the main housing 8 by means of a two-piece basket 44, 46. The two pieces 44, 46 of the basket are held together by fasteners 48 to securely hold the magnet 42 in position on the housing 22. The shaft 24 and the basket 44, 46 serve as a link between the magnet 42 and the structure whose position is to be determined by use of the sensor 2. The end of the shaft 24 opposite the basket 44, 46 may be directly attached to the structure or attached thereto by means of additional intervening members.

The sealed tubular housing 22 provides a hermetically sealed inner space in which a ferromagnetic follower 28 and the transmitting and receiving end of a fiber optic transmitter and receiver are located. The transmitting and receiving end includes the end of an optical fiber 14 and a collimating lens 40 to make light received through the fiber 114 parallel. The fiber 14 is mounted on the main housing 8 by means of a connector 12 carried by an annular mounting ring 16. The fiber 14 extends through the connector 12 and the end portions of the housing 8 into the sealed tubular housing 22.

Light from the fiber 14 is directed by the lens 40 to a reflector 30 carried by the follower 28. The structure of the follower 28 and the reflector 30 can best be seen in FIGS. 3-6. The follower 28 is in the form of a hollow cylinder with annular flat end surfaces 27. The cavity formed by the tubular configuration of the follower 28 increases magnetic flux exiting from the end surfaces 27. The end of the follower 28 that receives the reflector 30 has an angled seat 29 formed therein recessed inwardly from the flat end surface 27. If the follower 28 carries a second identical reflector 30 on its opposite end, as shown in FIG. 1, a second seat is formed on the other end of the follower 28. The length of the follower is essentially equal to the distance between the poles of the magnet 42.

Referring to FIGS. 3-6, the reflector 30 is a corner cube reflector, i.e. it is a type of reflector for which light has an angle of reflection equal to its angle of incidence. This type of reflector allows the use of a single optical fiber for both transmitting light to, and receiving light back from, the reflector. It also makes the amount of light received back from the reflector independent of the angular position of the transmitted beam. The reflector 30 shown in FIGS. 3-6 has three identical facets 34 that meet at an apex A. Opposite the apex A, the reflector 30 has a cylindrical surface 38 with an axis X that extends through the apex A. The end of the reflector 30 opposite the apex A is a flat radial surface 32. The reflector 30 is received into the follower 28 apex A first, as shown in FIG. 6. When in position inside the follower 28, the reflector 30 contacts the seat 29 along three lines defined by reflector edges each of which is a juncture line between two of the facets 34. The reflector 30 is adhesively bonded to the seat 29 along the lines of contact to ensure against displacement of the reflector 30 from its seated position. The radial end surface 32 of the reflector 30 is recessed inside the follower 28, i.e. is spaced axially inwardly from the flat end surface 27 of the follower 28, to prevent scratching of the reflector 30.

A second preferred embodiment of the invention is shown in FIGS. 7-11. In this embodiment, the sensor 102 includes a plurality of sensor units to give the sensor 102 built-in redundancy. As shown in FIGS. 7, 9, and 11, the sensor 102 has three sensing units to give the sensor 102 triple redundancy. Such redundancy is desirable, and commonly required, in environments like aircraft environments in which failure of a sensor could create serious safety concerns. With three sensing units that are operated independently, a failure of one of the units still leaves full capability of the system to determine the position of the actuator or other structure to which the sensor 102 is attached.

Referring to FIG. 7, the sensor 102 has an outer housing structure similar to that of the sensor 2 shown in FIGS. 1 and 2. It includes a main outer housing 108 with opposite end caps 110, 150. The end closed by the end cap 110 is provided with a mounting flange 106 for attaching the sensor 102 to a fixed support structure. An input shaft 124 extends axially inwardly into the housing 108 through the opposite end cap 150.

Each of the three sensing units of the sensor 102 includes a hermetically sealed tubular housing 122. The housings 122 are mounted within the main housing 108 with their axes parallel to each other and to the axis of the main housing 108. The opposite ends of each tubular housing 122 are attached to and supported by the opposite end caps 110, 150. As shown in FIG. 8, a ferromagnetic follower 28, identical to the follower 28 of the embodiment of FIGS. 1 and 2, is positioned inside each of the tubular housings 122. The follower 28 carries the reflector 30 shown in FIGS. 3-6. An optical fiber 114 extends into the housing 122 for transmitting light to, and receiving reflected light back from, the reflector 30.

Each of the sensing units further includes a ring magnet 42, one of which is shown in FIG. 10. Each of the three magnets 42 is positioned surrounding the corresponding tubular housing 122, as best seen in FIG. 11. The three magnets 42 are carried by a two-piece basket 144, 146 to be axially movable along their corresponding tubular housings 122. The two pieces of the basket 144, 146 are held together by fasteners 148. As in the other embodiment, the basket 144, 146 is attached to the end of the input shaft 124 inside the main housing 108. The other end of the shaft 124 is attached to the actuator or other structure so that the shaft 124 moves in an axial direction in response to movement of the actuator. Axial movement of the magnets 42 along the outer cylindrical surfaces of the tubular housings 122 causes corresponding axial movement of the followers 28 inside the housings 122.

Each follower 42 has a normal rest or equilibrium position in which it is radially adjacent to the magnet 42 and its opposite flat end surfaces 27 are adjacent to the axially spaced apart poles of the magnet 42. As discussed in detail above, the magnetic coupling between each magnet 42 and its corresponding follower 28 causes the magnet 42 to restore the follower 28 to the rest position upon relative axial movement between the magnet 42 and the follower 28.

The various components of each of the sensors 2, 102 may be made from a number of materials. The materials from which the magnets 42 and the ferromagnetic followers 28 are made are chosen so that the magnetic coupling between each magnet 42 and its corresponding follower 28 meets specific predetermined performance characteristics. The other components of the sensors 2, 102 are made from materials that will not create interference with the magnetic coupling between the followers 28 and their magnets 42. In particular, the tubular housings 22, 122 and the baskets 44, 46, 144, 146 which carry the magnets 42, are non-magnetic. Suitable materials for these components include aluminum, non-magnetic stainless steel, high strength plastics, and alumina ceramics. The latter are ceramics that include aluminum oxide $Al_2O_5$, which may vary in percentage. The ceramics are desirable materials because of their high compressive strength and hard surfaces that reduce friction and wear.

The method of the invention is preferably carried out using the apparatus illustrated in FIGS. 1-11 and described above. The magnet or magnets 42 are linked to the structure whose position is to be determined by means of the input shaft/basket structure described above. The linking of the magnet 42 to the structure causes movement of the structure to translate the magnet 42 axially along the outer cylindrical surface of the corresponding hermetically sealed tubular housing 22, 122. The magnetic coupling between the magnet 42 and the follower 28 inside the housing 22, 122 causes corresponding axial movement of the follower 28. In the illustrated embodiments, resistance to movement of the follower 28 by back pressure is avoided by evacuating the tubular housing 22, 122. The use of an evacuated housing is desirable when the space occupied by the sensor of the invention is to be kept at a minimum. However, it is within the scope of the invention to instead provide an inert medium inside the housing, such as dry nitrogen gas, and to prevent back pressure by providing passageways interconnecting the two ends of the inner space of the housing on opposite sides of the follower.

The method of the invention includes transmitting light into the inner space of the tubular housing 22, 122 through a fiber optic transmitter and receiver. The transmitting and receiving end of the transmitter and receiver is located inside the inner housing space and transmits light to, and receives reflected light back from the reflector 30 carried by the follower 28. In the preferred embodiments, the transmitting and receiving end comprises the end of a single optical fiber 14, 114. The reflected light is picked up by the fiber end and transmitted via the fiber 14, 114 to a remote location where the transit time of the light from the fiber end to the reflector 30 and back to the fiber end is measured. The light is preferably transmitted to the reflector 30 in pulses to facilitate the measuring of the transit time. Distance between the fiber end and the reflector 30 is calculated as a function of the transit time, using the known speed of light. The calculated distance, in turn, indicates the position of the structure to which the magnet 42 is linked.

In the triple redundant embodiment 102 shown in FIGS. 7-11, the light source and measuring and calculating components associated with each sensing unit may be independent from the same components corresponding to the other sensing units so that the sensor 102 is truly triple redundant. A failure in any one of the sensing units or its associated components will have no effect on the other units and the determinations provided thereby. Therefore, the determination of the position of the structure can continue to be accurately determined unless the extremely unlikely event of a failure in all three subsystems occurs.

Another way in which the reliability of the sensor can be increased is to provide the sensor with a self-checking capability. This may be accomplished by providing a second reflector 30 identical to the first and carried by the follower 28 facing about 180° away from the fiber end that is directed toward the first reflector 30. In such an arrangement, the sensing unit would have a second optical fiber end directed toward the second reflector 30. Light is transmitted through this second fiber end into the hermetically sealed space and to the second reflector 30, which reflects the light back to the second fiber end. The travel time of the light transmitted to and reflected back by the second reflector 30 is measured and used as a basis for calculating the distance between the second fiber end and the second reflector 30, as described above. Then, the two calculated distances are added and compared to the span between the two fiber ends minus the distance between the two reflectors 30 to check the accuracy of the sensor. If the sensor is operating properly, the two values being compared will at all times be equal.

In the system of the invention, the movable portion of the light radar (the reflector 30) is linked to the actuator whose position is being determined by a magnetic coupling, rather than a rigid direct mechanical link. As explained above, the spring characteristics of the coupling causes inaccuracies in the position of the follower/reflector relative to the magnet and, thus, the actuator. The preferred embodiments of the sensor 2, 102 are designed to minimize the inaccuracies. In particular, the hollow cylindrical configuration of the follower 28 maximizes the ratio of magnetic coupling (effective spring constant) to follower mass.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. A sensor for determining the position of a structure, comprising:
   a non-magnetic tubular housing having a longitudinal axis and defining a hermetically sealed inner space; said housing including an axially extending sidewall;
   a magnet positioned adjacent to and axially movable along an outer surface of said sidewall; said magnet having opposite poles axially spaced apart;
   a link having a first end attached to said magnet, and a second end attachable to the structure;
   a ferromagnetic follower positioned in and axially movable within said space; said follower being magnetically coupled to said magnet to follow axial movement of said magnet;
   a fiber optic transmitter and receiver extending into said space; and
   a reflector carried by said follower and positioned to receive light from, and reflect said light back to, said transmitter and receiver;
wherein said follower has a rest position radially adjacent to said magnet, and said magnet is capable of restoring said follower to said rest position upon relative axial movement between said magnet and said follower.

2. The sensor of claim 1, in which said magnet is a ring magnet and surrounds said housing, and said follower is substantially cylindrical and has opposite flat end surfaces normally adjacent to said poles.

3. The sensor of claim 2, in which said follower has a cavity formed therein to increase magnetic flux exiting from said end surfaces.

4. The sensor of claim 3, in which said cavity opens onto a first one of said end surfaces, and said reflector is received into an outer end portion of said cavity adjacent to said first end surface.

5. The sensor of claim 1, in which said transmitter and receiver comprises a single optical fiber that both transmits and receives light, and said reflector comprises a corner cube reflector.

6. The sensor of claim 2, in which said transmitter and receiver comprises a single optical fiber that both transmits and receives light, and said reflector comprises a corner cube reflector.

7. The sensor of claim 1, further comprising a second reflector carried by said follower and facing about 180° away from said transmitter and receiver, and a second transmitter and receiver extending into said space; said second reflector being positioned to receive light from, and reflect light back to, said second transmitter and receiver.

8. The sensor of claim 1, in which said poles are axially spaced apart a predetermined distance, and said follower has a length substantially equal to said predetermined distance.

9. The sensor of claim 8, in which said magnet is a ring magnet and surrounds said housing, and said follower is substantially cylindrical and has opposite flat end surfaces normally adjacent to said poles.

10. The sensor of claim 9, in which said follower has a cavity formed therein to increase magnetic flux exiting from said end surfaces.

11. A sensor for determining the position of a structure, comprising:
   a non-magnetic basket;
   a link having a first end attached to said basket, and a second end attachable to the structure; and
   a plurality of sensor units, each said unit comprising:
   a non-magnetic tubular housing having a longitudinal axis and defining a hermetically sealed inner space; said housing including an axially extending sidewall;
   a magnet carried by said basket and positioned adjacent to and axially movable along an outer surface of said sidewall; said magnet having opposite poles axially spaced apart;
   a ferromagnetic follower positioned in and axially movable within said space; said follower being magnetically coupled to said magnet to follow axial movement of said magnet;
   a fiber optic transmitter and receiver extending into said space; and
   a reflector carried by said follower and positioned to receive light from, and reflect said light back to, said transmitter and receiver;
wherein said follower has a rest position radially adjacent to said magnet, and said magnet is capable of restoring said follower to said rest position upon relative axial movement between said magnet and said follower.

12. The sensor of claim 11, in which, in each said unit, said magnet is a ring magnet and surrounds said housing, and said follower is substantially cylindrical and has opposite flat end surfaces normally adjacent to said poles.

13. The sensor of claim 12, in which each said follower has a cavity formed therein to increase magnetic flux exiting from said end surfaces.

14. The sensor of claim 13, in which, in each said unit, said cavity opens onto a first one of said end surfaces, and said reflector is received into an outer end portion of said cavity adjacent to said first end surface.

15. The sensor of claim 11, in which, in each said unit, said transmitter and receiver comprises a single optical fiber that both transmits and receives light, and said reflector comprises a corner cube reflector.

16. The sensor of claim 12, in which, in each said unit, said transmitter and receiver comprises a single optical fiber that both transmits and receives light, and said reflector comprises a corner cube reflector.

17. The sensor of claim 11, in which, in each said unit, said poles are axially spaced apart a predetermined distance, and said follower has a length substantially equal to said predetermined distance.

18. The sensor of claim 17, in which, in each said unit, said magnet is a ring magnet and surrounds said housing, and said follower is substantially cylindrical and has opposite flat end surfaces normally adjacent to said poles.

19. The sensor of claim 18, in which each said follower has a cavity formed therein to increase magnetic flux exiting from said end surfaces.

20. A method for determining the position of a structure, comprising:
   providing a non-magnetic tubular housing having a longitudinal axis and defining a hermetically sealed inner space;
   positioning a magnet adjacent to an outer axially extending surface of said housing, and positioning opposite poles of said magnet axially spaced apart;
   providing a ferromagnetic follower in said space, and a reflector carried by said follower;
   positioning a transmitting and receiving end of a fiber optic transmitter and receiver in said space directed toward said reflector;
   linking said magnet to the structure to cause movement of the structure to translate said magnet axially along said surface;
   magnetically coupling said follower to said magnet so that axial movement of said magnet causes corresponding axial movement of said follower, including aligning said follower to be radially adjacent to said magnet;
   transmitting light through said transmitting and receiving end into said space, and allowing said reflector to reflect said light back to said transmitting and receiving end; and
   measuring transit time of said light from said transmitting and receiving end to said reflector and back to said transmitting and receiving end, and calculating distance between said transmitting and receiving end and said reflector as a function of said time.

21. The method of claim 20, in which said magnet is a ring magnet, and said follower is substantially cylindrical and has opposite flat end surfaces adjacent to said poles; and which comprises positioning said magnet to surround said housing, and increasing magnetic flux exiting from said end surfaces by providing a cavity in said follower.

22. The method of claim 20, in which said reflector is a corner cube reflector; and which comprises transmitting said light from, and receiving said light reflected back from said reflector back into, a single optical fiber.

23. The method of claim 20, further comprising providing a second reflector carried by said follower and facing about 180° away from said transmitting and receiving end; providing a second fiber optic transmitting and receiving end directed toward said second reflector; transmitting light through said second end into said space, and allowing said second reflector to reflect said light from said second end back to said second end;

measuring travel time of said light from said second end to said second reflector and back to said second end, and calculating distance between said second end and said second reflector as a function of said travel time; and using distance between said transmitting and receiving ends and distance between said reflectors to check the calculated distances for accuracy.

24. The method of claim 20, comprising providing a plurality of said housings and corresponding magnets, followers, reflectors, and transmitting and receiving ends; and linking said magnets to the structure by attaching said magnets to a basket, and linking said basket to the structure, to cause movement of the structure to simultaneously translate each said magnet axially along its corresponding housing.

25. A linear transducer comprising:

a non-magnetic tubular housing having a longitudinal axis and defining an inner space, said housing including an axially extending cylindrical sidewall;

a ring magnet surrounding and axially movable along said sidewall, said magnet having opposite poles axially spaced apart; and a cylindrical ferromagnetic follower positioned in and axially movable within said space; said follower being magnetically coupled to said magnet to follow axial movement of said magnet; and said follower having opposite flat end surfaces normally adjacent to said poles, and a cavity formed in said follower to increase magnetic flux exiting from said end surfaces;

wherein said follower has a rest position radially adjacent to said magnet, and said magnet is capable of restoring said follower to said rest position upon relative axial movement between said magnet and said follower.

* * * * *